US006868672B2

(12) United States Patent
Luo

(10) Patent No.: US 6,868,672 B2
(45) Date of Patent: Mar. 22, 2005

(54) METHOD OF CONTROLLING A SWINGING BOOM AND APPARATUS FOR CONTROLLING THE SAME

(75) Inventor: Nianzhu Luo, Easley, SC (US)

(73) Assignee: Sauer-Danfoss, Inc., Ames, IA (US)

(*) Notice: Subject to any disclaimer, the term of this patent is extended or adjusted under 35 U.S.C. 154(b) by 154 days.

(21) Appl. No.: 10/437,323

(22) Filed: May 13, 2003

(65) Prior Publication Data

US 2004/0226292 A1 Nov. 18, 2004

(51) Int. Cl.[7] .................................................. F16D 31/02
(52) U.S. Cl. .............................................. 60/468; 91/466
(58) Field of Search ..................... 60/464, 468; 91/436, 91/437, 466

(56) References Cited

U.S. PATENT DOCUMENTS

| | | | | |
|---|---|---|---|---|
| 2,965,133 A | * 12/1960 | Rice et al. | .................... | 91/437 |
| 3,722,543 A | 3/1973 | Tennis | | |
| 4,518,004 A | 5/1985 | Hsu et al. | | |
| 4,878,418 A | 11/1989 | Badia | | |
| 4,887,643 A | 12/1989 | Tomlin et al. | | |
| 4,953,582 A | 9/1990 | Kennedy | | |
| 5,065,664 A | 11/1991 | Ohta et al. | | |
| 5,161,575 A | 11/1992 | Morikawa et al. | | |

FOREIGN PATENT DOCUMENTS

| | | |
|---|---|---|
| JP | 58128488 A | 8/1983 |

* cited by examiner

*Primary Examiner*—Edward K. Look
*Assistant Examiner*—Michael Leslie

(57) ABSTRACT

A swing speed compensation device is provided for use with a flow sharing hydraulic system. The present invention is mounted within the metering spool of a flow sharing valve and includes a poppet that is attached to a spring retainer. The spring retainer encases a compression spring which pushes against a plug and has a drain hole that, depending upon the position of the spring retainer and poppet combination, can vent excess pressure within the present invention to a hydraulic pump tank. When a flow sharing hydraulic system starts or stops, there is a rush in the fluid flow that can cause a spike in the system pressure. The present invention absorbs this pressure spike, allowing for the fluid flow to gradually increase or decrease as the system starts or stops.

5 Claims, 7 Drawing Sheets

METHOD OF CONTROLLING A SWINGING BOOM AND APPARATUS FOR CONTROLLING THE SAME

BACKGROUND OF THE INVENTION

This invention relates generally to a flow sharing hydraulic system and, more particularly, to swing speed compensation for such a system.

Flow sharing hydraulic systems have been known in the art in recent times. Typically, these systems are used to control the movement of large swinging booms, such as a backhoe device. These systems utilize a metering spool that can be slidably engaged within a flow sharing valve to alter the path of the hydraulic fluid and, consequently, the movement of the swinging boom.

It is well established in the art to use a metering spool to control the function of a swinging boom. In a flow sharing hydraulic system, the metering spool has a solid center and multiple segments of different cross-sectional areas. Depending upon the position of the metering spool within the flow sharing valve, hydraulic fluid flow is provided to the system proportionally according to the cross-sectional area of the engaged segment of the metering spool.

One disadvantage of a flow sharing hydraulic system is that it provides constant fluid flow regardless of the angle and position of the swinging boom. Because of this constant fluid flow, the speed of the swinging boom is not smooth, particularly when starting or stopping the swing movement of the boom. The boom tends to have "jerking" swing movement upon starting or stopping of the boom.

To overcome this disadvantage, it has become well known in the art to add an anti-swag valve to the flow sharing hydraulic system. An anti-swag valve varies the fluid flow depending upon the angle and position of the swinging boom. Such a valve, however, is a very costly device that must be built on to the system.

It is therefore a principal object of this invention to provide a flow sharing hydraulic system that allows for variable fluid flow depending upon the angle and position of the swinging boom.

A further object of this invention is to provide such a system cost-effectively, without the need for anti-swag valves.

These and other objects will be apparent to those skilled in the art.

BRIEF SUMMARY OF THE INVENTION

The present invention is directed towards a swing speed compensation device for a flow sharing hydraulic system.

The present invention is mounted within the metering spool of a flow sharing valve. It includes a poppet that is attached to a spring retainer. The spring retainer encases a compression spring which pushes against a plug and works to maintain the poppet in a closed position. The spring retainer also has a drain hole that, depending upon the position of the spring retainer and poppet combination, can vent excess pressure within the swing speed compensation device to a hydraulic pump tank.

When a flow sharing hydraulic system starts or stops, there is a rush in the fluid flow that can cause a spike in the system pressure. The present invention absorbs this pressure spike, allowing for the fluid flow to gradually increase or decrease as the system starts or stops. As a result, a device operated by a flow sharing hydraulic system equipped with the present invention, such as a swinging boom, will operate smoothly, without "jerking" movement.

DESCRIPTION OF THE PREFERRED EMBODIMENT

Figure 1:
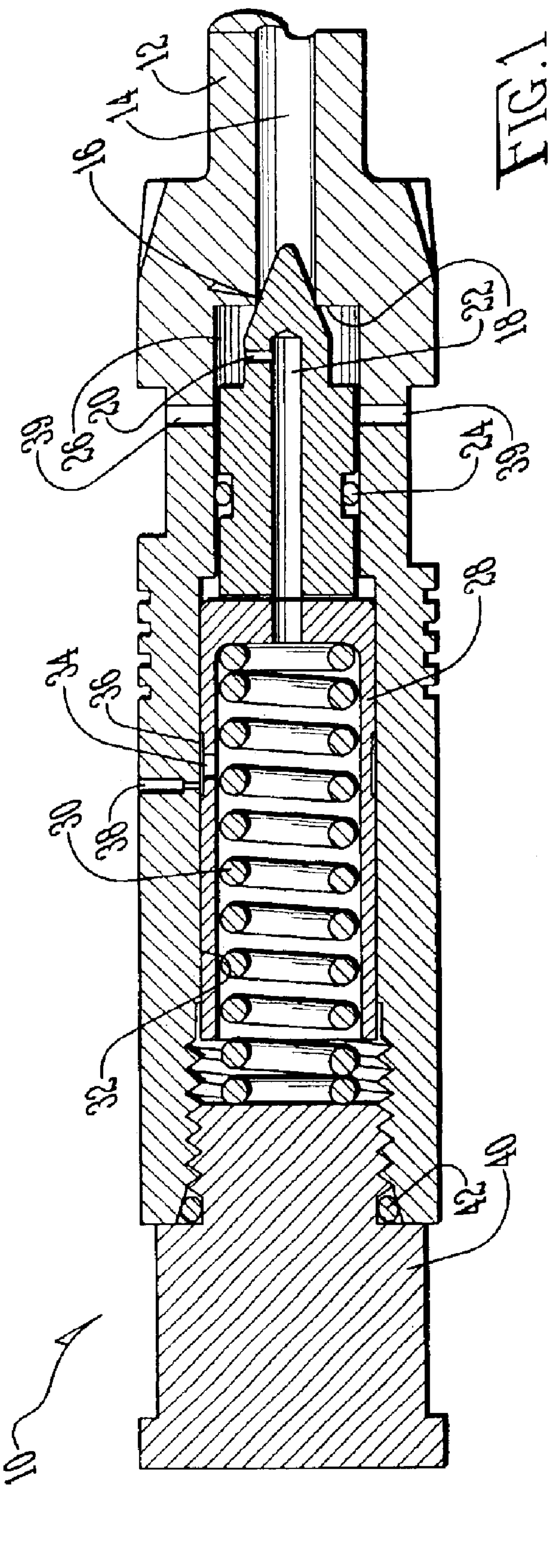
FIG. 1 is a cross-sectional view of the present invention.

With reference to FIG. 1, the numeral 10 designates a swing speed compensation assembly 10 incorporated within metering spool 12. Metering spool 12 has an internal bore 14 that serves as an inlet to the swing speed compensation assembly 10. Swing speed compensation assembly 10 includes a poppet 16, which has a seat 18, inlet port 20 which is in fluid communication with an internal bore 22 of the poppet 16, and O-ring 24. O-ring 24 forms a seal between poppet 16 and second internal bore 26 of metering spool 12. Poppet 16 is attached to a spring retainer 28, which encloses a helical compression spring 30. Spring retainer 28 travels within a third internal bore 32 of metering spool 12. Spring retainer 28 has a drain hole 34 that connects to a slot 36. Depending upon the position of spring retainer 28 within bore 32, slot 36 may or may not be in fluid communication with exhaust port 38 in metering spool 12, and internal bore 22 may or may not be in fluid communication with exhaust port 39. Compression spring 30 presses against plug 40, which is threadably attached to metering spool 12 and sealed by O-ring 42.

Poppet 16 seats against internal bore 14 of metering spool 12. The hydraulic fluid pressure within bore 14 (hereinafter "P1") presses against poppet 16 and works to drive poppet 16 away from bore 14, from a closed position as shown in FIG. 1 to a relief position where poppet 16 is not in contact with bore 14. As poppet 16 moves from the closed position to the relief position, some of P1 passes from bore 14 and into second internal bore 26 of metering spool 12. Internal bore 26 of metering spool 12 serves as a pressure chamber, assisting P1 in the opening of poppet 16. The hydraulic fluid pressure within bore 26 (hereinafter "P2") works in combination with P1 to quickly drive poppet 16 from the closed position to the relief position. P2 enters inlet port 20 of poppet 16 and travels through internal bore 22 of poppet 16 to internal bore 32 of metering spool 12.

The hydraulic fluid pressure within bore 32 (hereinafter "P3") works to resist P1 and P2. When poppet 16 is in the closed position, P3 is free to enter drain hole 34, travel through slot 36, and exit the metering spool through exhaust port 38. When the force created by P1 and P2 is greater than the resisting force created by P3 and compression spring 30, poppet 16 will move from the closed position to the relief position. Because of slot 36, drain hole 34 remains in fluid communication with exhaust port 38 while the poppet 16 is intermittent between the closed and relief positions. Once poppet 16 is in the full relief position, slot 36 is no longer in fluid communication with exhaust port 38. This prevents P3 from leaving the metering spool 12 and allows P3 to increase in pressure. Simultaneously, when poppet 16 is in the full relief position the internal bore 22 becomes in fluid communication with exhaust port 39, allowing P2 and P1 to decrease. When the force resulting from P3 and compression spring 30 can overcome the force resulting from P1 and P2, the poppet 16 will return to the closed position.

Because of the assistance of P2 as well as the slot 36, the poppet 16 moves quickly from the closed position to the relief position, allowing for the immediate venting of spikes in P1. Because of compression spring 30, the poppet 16 tends to move considerably slower when traveling from the relief to the closed positions. The performance of the swing speed compensation assembly 10 depends upon the specific application and can be adjusted by varying the characteristics of compression spring 30 to increase or decrease the spring stiffness as desired.

Figure 2:
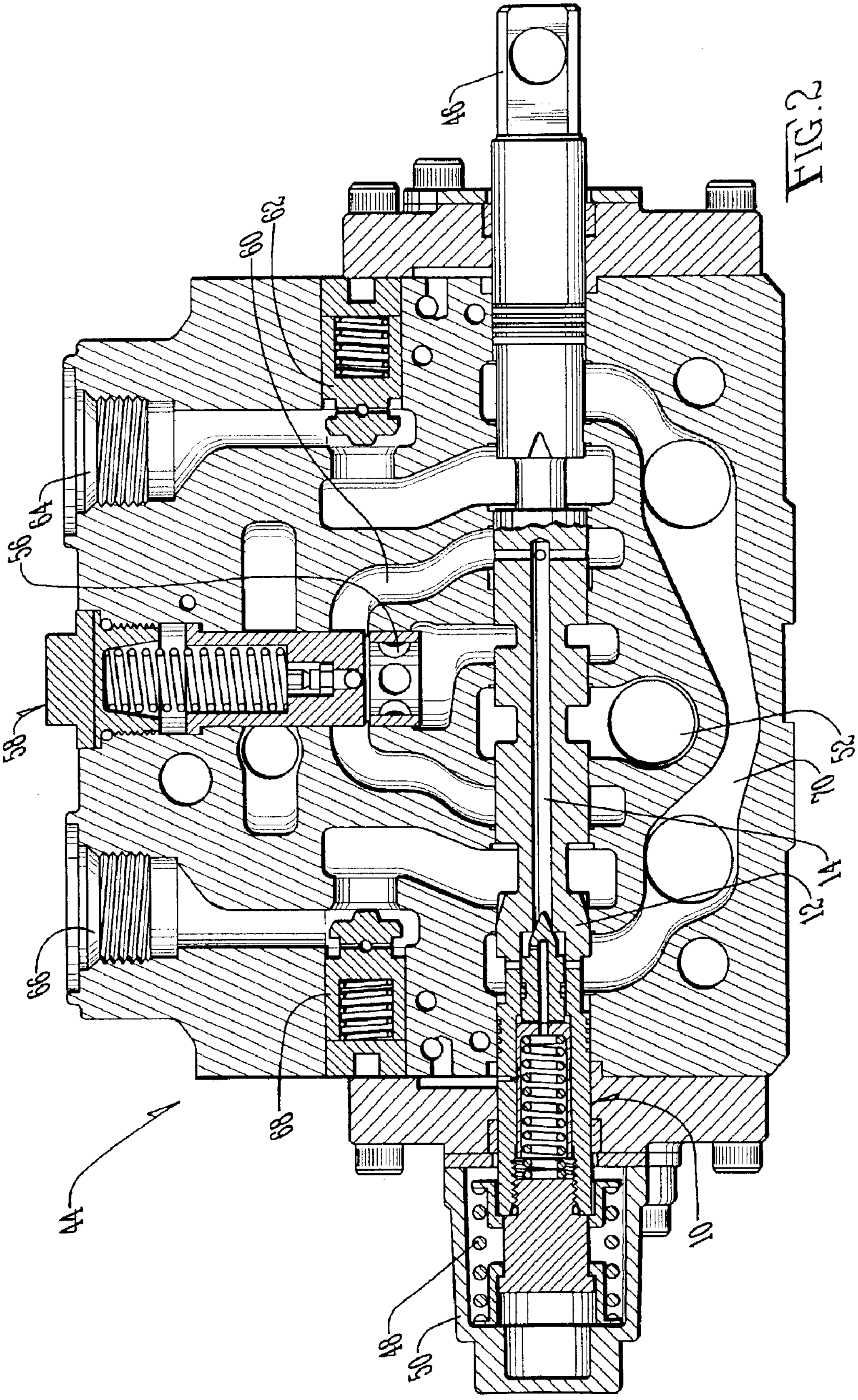
FIG. 2 is a cross-sectional view of a flow sharing hydraulic system with the metering spool in the neutral position.
Figure 3:
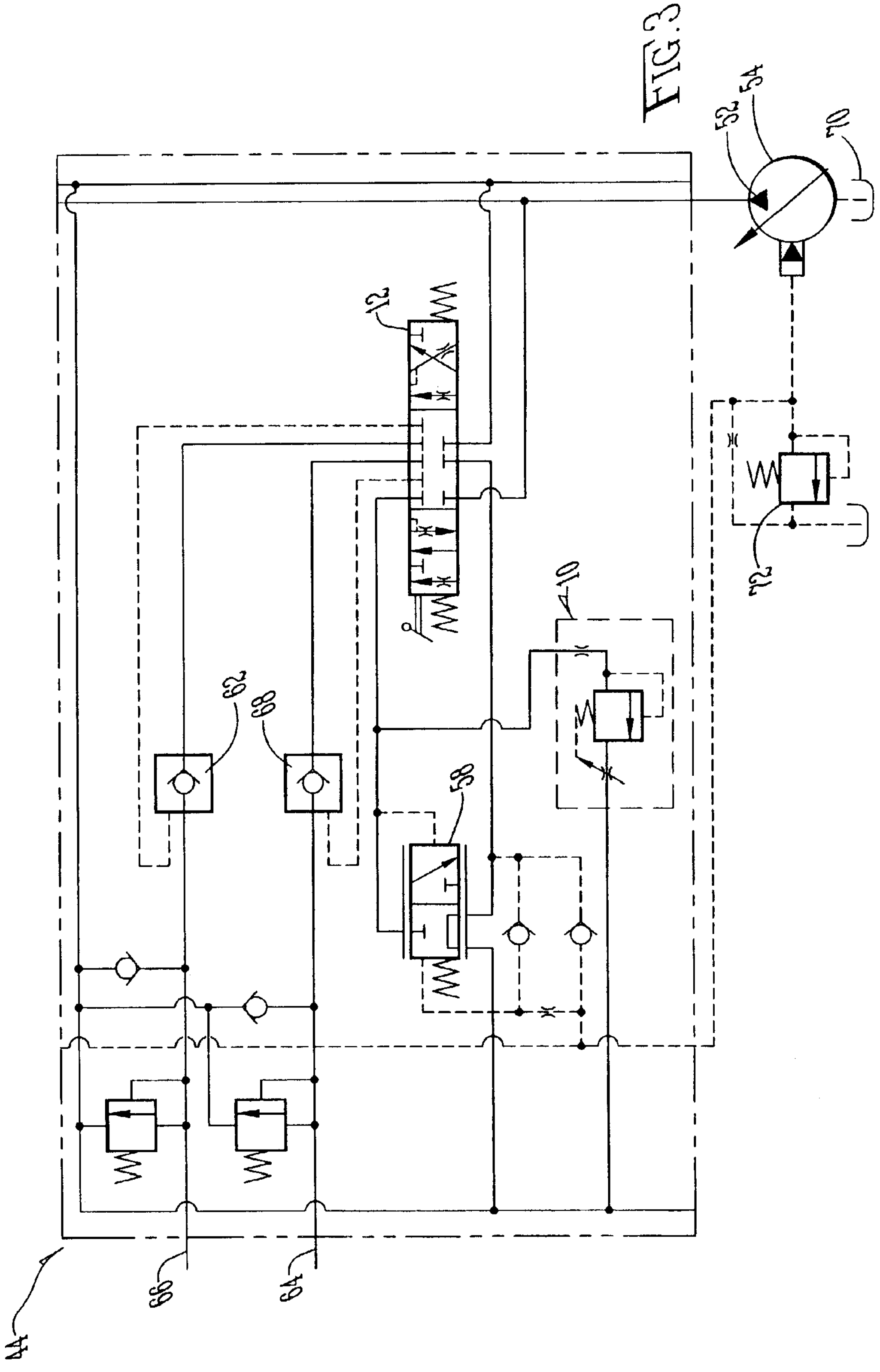
FIG. 3 is a schematic of a flow sharing hydraulic system with the metering spool in the neutral position.

Metering spool 12, which houses swing speed compensation assembly 10, slides within flow sharing valve 44, as shown in FIG. 2. Metering spool 12 is manually adjusted by end 46 and is biased by compression spring 48 located within end cap 50. FIGS. 2 and 3 both depict the flow sharing valve circuit when the metering spool 12 is in the neutral position. When the metering spool 12 is in the neutral position, the spool 12 will block the flow of hydraulic fluid from the inlet 52 of pump 54. As such, there is no flow bypassed through internal bore 14 to the swing speed compensation assembly 10 and the swing speed compensation assembly 10 remains in the closed position at all times while the metering spool 12 is in the neutral position.

Figure 4:
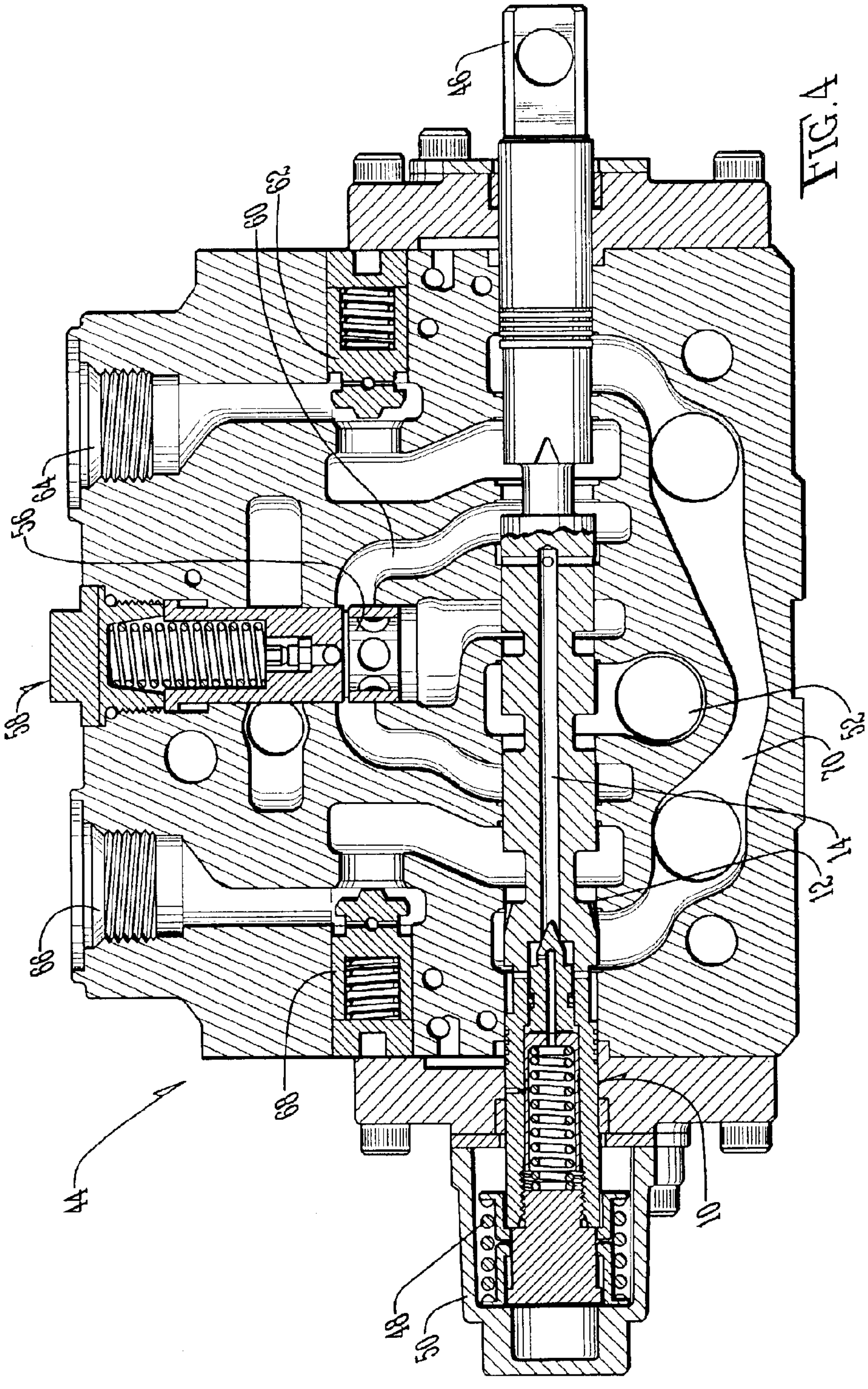
FIG. 4 is a cross-sectional view of a flow sharing hydraulic system with the metering spool in the inward position.
Figure 5:
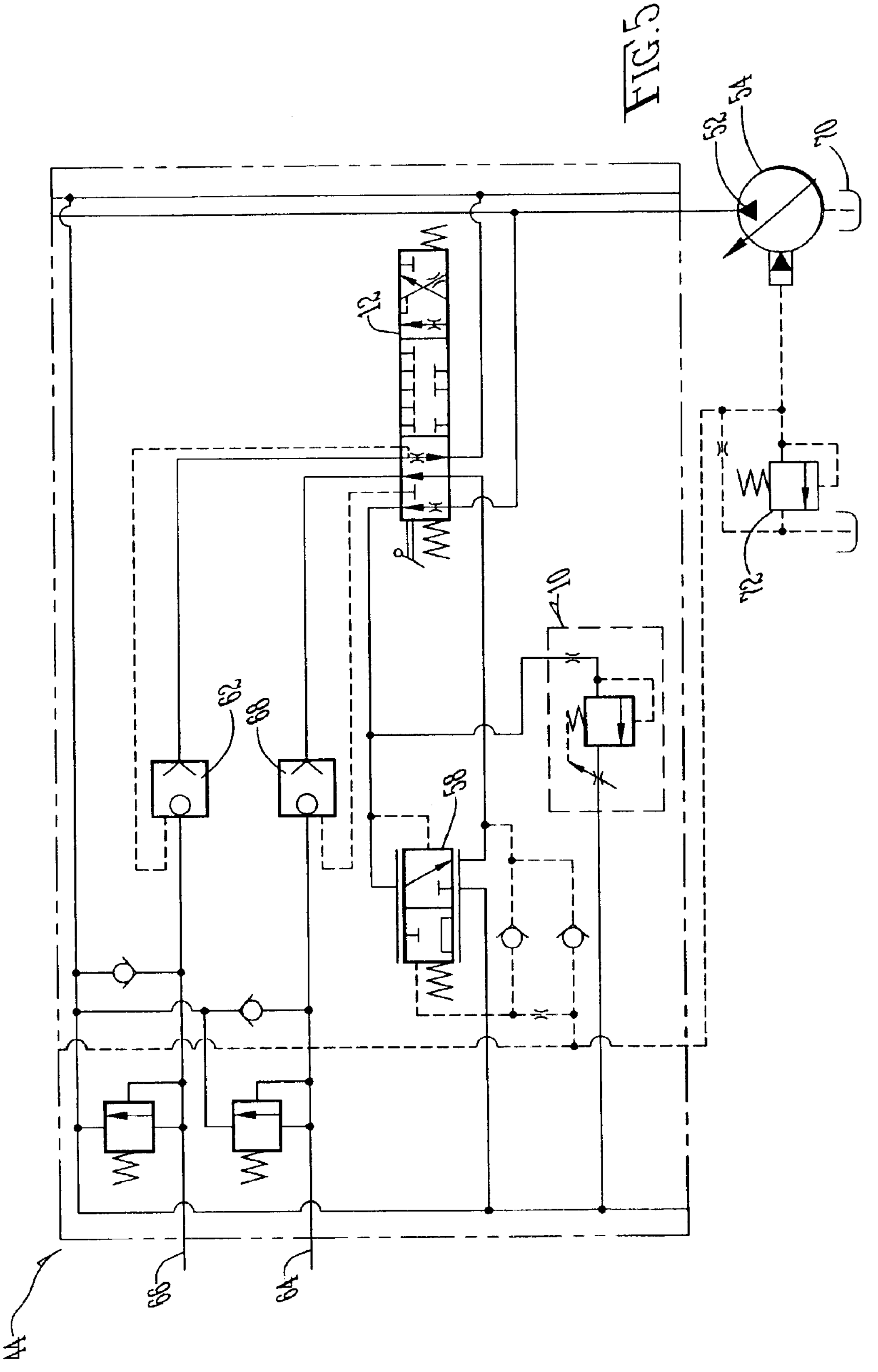
FIG. 5 is a schematic of a flow sharing hydraulic system with the metering spool in the inward position.

When the metering spool 12 is pushed to the inward position, as shown in FIGS. 4 and 5, hydraulic fluid from the inlet 52 of pump 54 is allowed to flow past the metering spool 12 and into the inlet 56 of the pressure compensator 58. The pressure compensator 58 moves to an open position, allowing fluid to flow into the bridge 60. Pressure in the bridge builds up until it can overcome the load holding check valve 62 and move into cylinder port 64. Fluid flow returns from the cylinder (not shown) through cylinder port 66. Pressure again builds up at cylinder port 66 until it can overcome the load holding check valve 68 and move into tank 70.

Figure 6:
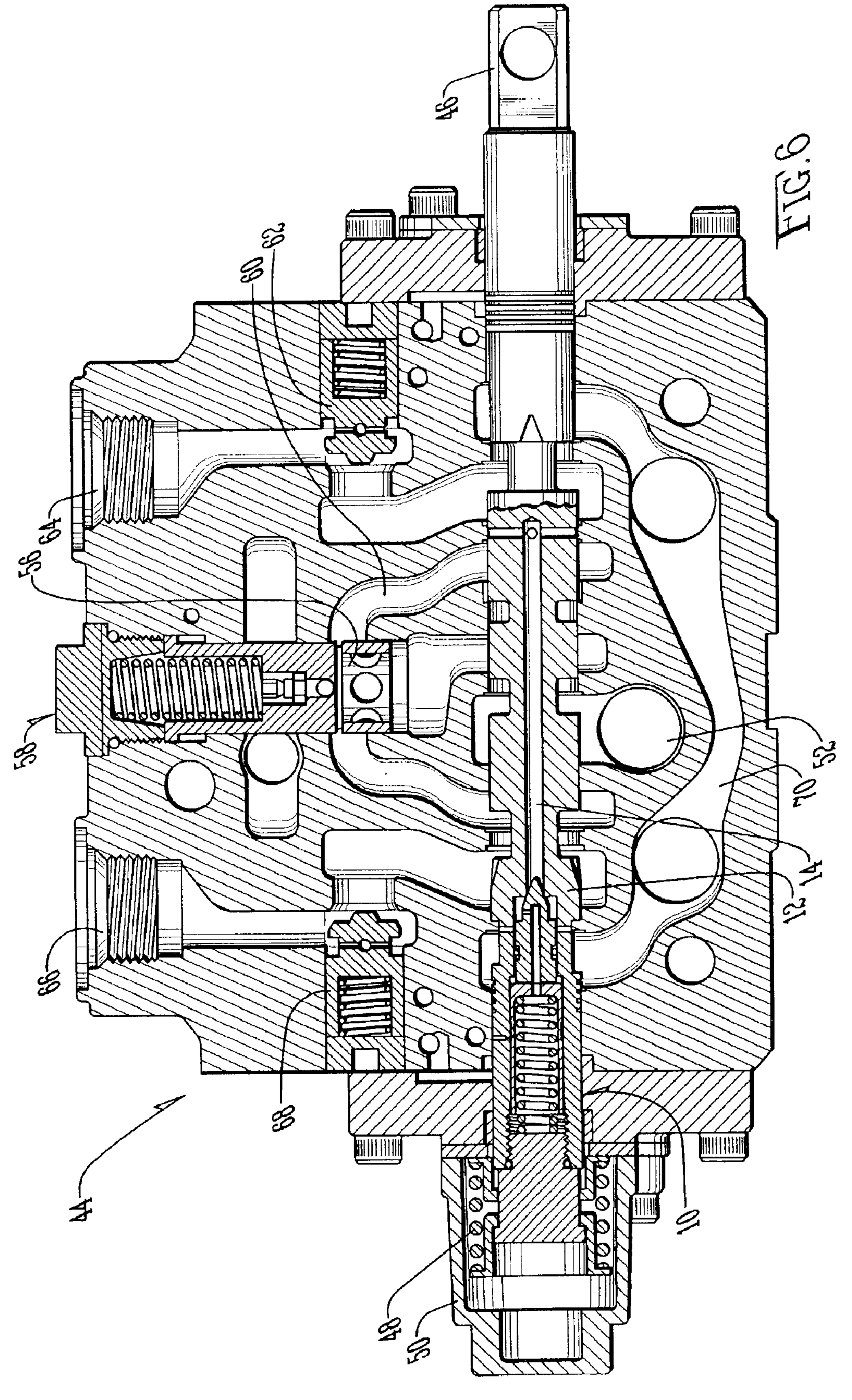
FIG. 6 is a cross-sectional view of a flow sharing hydraulic system with the metering spool in the outward position.
Figure 7:
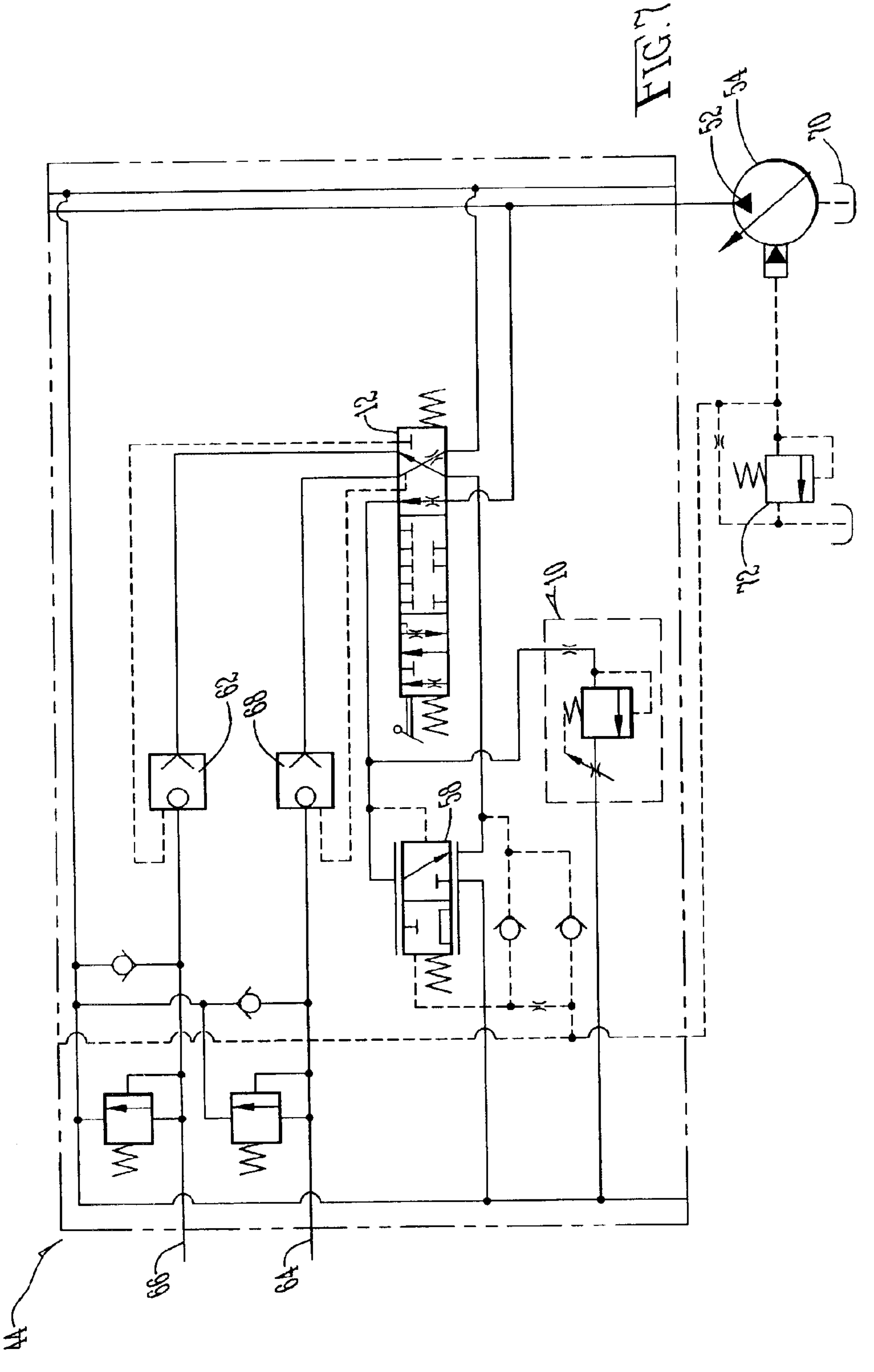
FIG. 7 is a schematic of a flow sharing hydraulic system with the metering spool in the outward position.

When the metering spool 12 is pulled to the outward position, as shown in FIGS. 6 and 7, hydraulic fluid from the inlet 52 of pump 54 is allowed to flow past the metering spool 12 and into the inlet 56 of the pressure compensator 58. The pressure compensator 58 moves to an open position, allowing fluid to flow into the bridge 60. Fluid flow moves similarly to that described above for when the metering spool 12 is in the inward position except that flow moves in the reverse direction. Pressure in the bridge builds up until it can overcome the load holding check valve 68 and move into cylinder port 66. Fluid flow returns from the cylinder (not shown) through cylinder port 64. Pressure again builds up at cylinder port 64 until it can overcome the load holding check valve 62 and move into tank 70.

The swing speed compensation assembly 10 can be triggered when the metering spool 12 is in either the inward or outward position. When the metering spool 12 is in either the inward or outward position, fluid flow moves past the metering spool 12 and into the bridge 60. In either the inward or outward positions, the bridge 60 is in fluid communication with the swing speed compensation assembly 10 via internal bore 14. When pressure in the bridge is higher than the swing speed compensation relief setting, the swing speed compensation assembly 10 triggers to absorb the excess pressure. Specifically, the fluid in the bridge 60 travels through internal bore 14 and acts as P1, as shown in FIG. 1. When pressure in the bridge 60 is sufficiently high, it will cause the poppet 16 (FIG. 1) to move from the closed to the relief position, thereby venting the excess pressure from the bridge and through the exhaust ports 38 and 39 (FIG. 1).

During operation of a swinging boom controlled by a flow sharing valve 44 utilizing a swing speed compensation assembly 10, the swing speed compensation assembly 10 will absorb spikes in the system pressure to prevent the swinging boom from "jerking." Specifically, when the metering spool 12 is engaged in either the inward or outward position, a rush of hydraulic fluid will enter the bridge 60, causing the system pressure to spike. This excess pressure will cause the swing speed compensation assembly 10 to open, venting the excess pressure through the exhaust ports 38 and 39 and back into the tank 70. Removing this excess pressure allows the hydraulic fluid to flow smoothly through the system, which ultimately causes the swinging boom to move smoothly, without "jerking."

Should an operator abruptly stop the motion of a swinging boom equipped with the swing speed compensation assembly 10, the load sense relief valve 72 in the system will open. Pump 54 will begin to reduce the output flow of hydraulic fluid; however, the response of pump 54 is considerably slower than the response of relief valve 72. This lag in response time will cause a spike in the system pressure. This excess pressure will cause the swing speed compensation assembly 10 to open, venting the excess pressure through the exhaust ports 38 and 39 and back into the tank 70. Removing this excess pressure allows the system to gradually slow down, which ultimately causes the swinging boom to smoothly come to a stop, without "jerking."

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A swing speed compensation assembly comprising:

a metering spool with an inlet in fluid communication with an inlet pressure;

an exhaust port in the spool;

a poppet in the spool having a closed position sealed against the inlet, and a relief position;

a chamber positioned next to the inlet and the poppet, the chamber storing the inlet pressure for use for driving the poppet from the closed position to the relief position;

a spring in the spool engaging and resisting the motion of the poppet; and a spring retainer attached to the poppet and housing the spring, the spring retainer having a drain hole in partial fluid communication with the exhaust port when the poppet is in the relief position.

2. The assembly of claim 1 wherein the spring retainer has a slot connected to the drain hole that is in partial fluid communication with the exhaust port when the poppet is in the closed position.

3. A metering spool for controlling hydraulic fluid having a neutral position and at least one active position, the metering spool comprising:

a body having an internal bore;

an inlet in the body connected to the internal bore and in fluid communication with an inlet pressure when the metering spool is not in the neutral position;

an exhaust port in the body connected to the internal bore;

a poppet in the internal bore having a closed position sealed against the inlet, and a relief position;

a chamber positioned next to the inlet and the poppet, the chamber storing the inlet pressure for use for driving the poppet from the closed position to the relief position;

a spring in the internal bore engaging and resisting the motion of the poppet; and a spring retainer attached to the poppet and housing the spring, the spring retainer having a drain hole in partial fluid communication with the exhaust port when the poppet is in the relief position.

4. A method of moving a swinging boom controlled by a flow sharing hydraulic system comprising:

placing the swinging boom on a platform;

connecting a hydraulic cylinder to the swinging boom;

connecting a flow sharing valve to the hydraulic cylinder;

connecting a metering spool to the flow sharing valve, the metering spool having a neutral position and at least one active position;

connecting a hydraulic pump to the flow sharing valve;

running the hydraulic pump to generate pressure in the system;

engaging the metering spool from the neutral position to the active position, thereby allowing hydraulic pressure to pass from the pump to the flow sharing valve;

venting excess hydraulic pressure in the flow sharing hydraulic system through a swing speed compensation assembly in the metering spool, thereby maintaining constant hydraulic pressure and preventing a spike in the hydraulic pressure;

directing hydraulic pressure into the cylinder thereby driving the cylinder and moving the position of the boom;

building up speed in the movement of the swinging boom with constant acceleration until the swinging boom reaches a desired position; and engaging the metering spool from the active position to the neutral position thereby stopping the flow of hydraulic fluid and slowing the swinging boom to a stop.

5. A method of moving a swinging boom controlled by a flow sharing hydraulic system comprising:

placing the swinging boom on a platform;

connecting a hydraulic cylinder to the swinging boom;

connecting a flow sharing valve to the hydraulic cylinder;

connecting a metering spool to the flow sharing valve, the metering spool having a neutral position and at least one active position;

connecting a hydraulic pump to the flow sharing valve;

running the hydraulic pump to generate pressure in the system;

engaging the metering spool from the neutral position to the active position, thereby allowing hydraulic pressure to pass from the pump to the flow sharing valve;

venting excess hydraulic pressure in the flow sharing hydraulic system through a swing speed compensation assembly in the metering spool, thereby maintaining constant hydraulic pressure and preventing a spike in the hydraulic pressure;

directing hydraulic pressure into the cylinder thereby driving the cylinder and moving the position of the boom;

building up speed in the movement of the swinging boom with constant acceleration until the swinging boom reaches a desired position;

opening a check valve in the flow sharing valve, thereby stopping the flow of hydraulic pressure into the cylinder and abruptly stopping the movement of the swinging boom; and venting excess hydraulic pressure in the flow sharing hydraulic system through the swing speed compensation assembly in the metering spool, thereby maintaining constant hydraulic pressure and preventing a spike in the hydraulic pressure.

* * * * *